United States Patent [19]
Itani et al.

[11] Patent Number: 5,177,785
[45] Date of Patent: Jan. 5, 1993

[54] METHOD AND SYSTEM FOR SECURE TELECOMMUNICATIONS

[75] Inventors: Tarek A. Itani; Talal Itani, both of Plano, Tex.

[73] Assignee: InterVoice, Inc., Dallas, Tex.

[21] Appl. No.: 705,101

[22] Filed: May 24, 1991

[51] Int. Cl.[5] .............................................. H04K 1/00
[52] U.S. Cl. .......................................... 380/6; 380/41; 380/49
[58] Field of Search ......................... 380/41, 49, 2, 6, 8

[56] References Cited
U.S. PATENT DOCUMENTS 4,214,126 7/1980 Wipff ...................................... 380/6
4,972,469 11/1990 Saltwick et al. ........................ 380/6

Primary Examiner—Thomas H. Tarcza
Assistant Examiner—David Cain
Attorney, Agent, or Firm—Winstead Sechrest & Minick

[57] ABSTRACT

There is disclosed a method and system for injecting a number of different signal patterns onto a tone encoded telecommunications line for the purpose of preventing unauthorized eavesdropping. The system relies upon the use of an unused column frequency of the DTMF signals and a notched filter to remove that frequency from received transmission. The second technique is the insertion of precise levels of three valid tones. A third method is the modulation of all of the tones yielding side tones which are also in the valid range, and a fourth method is by sending random signature tones on the line, thereby preventing tape recording and playback of the coded tone communcation.

59 Claims, 7 Drawing Sheets

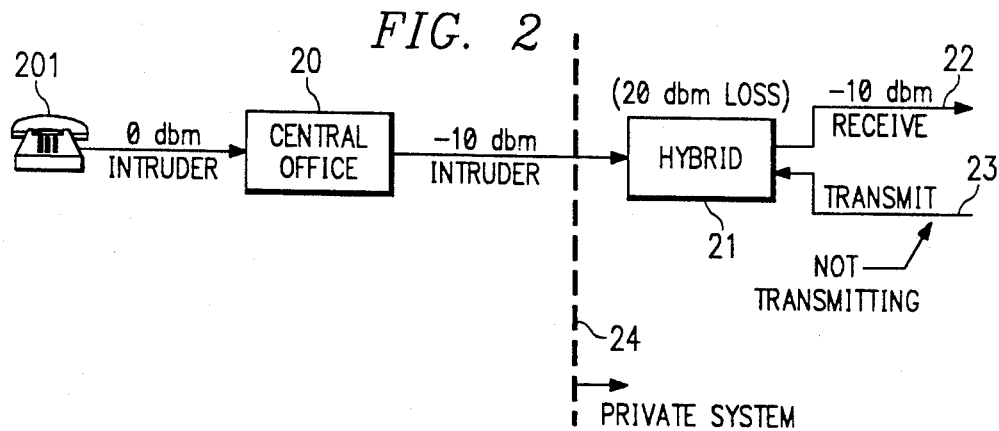
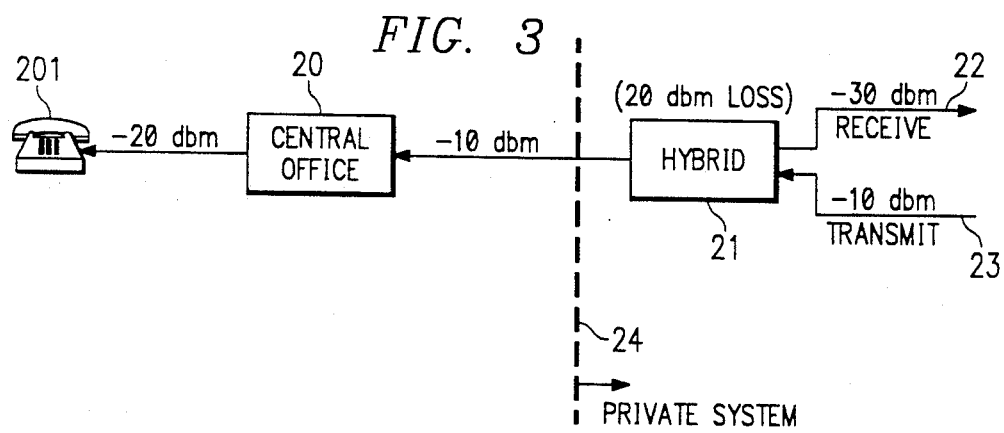
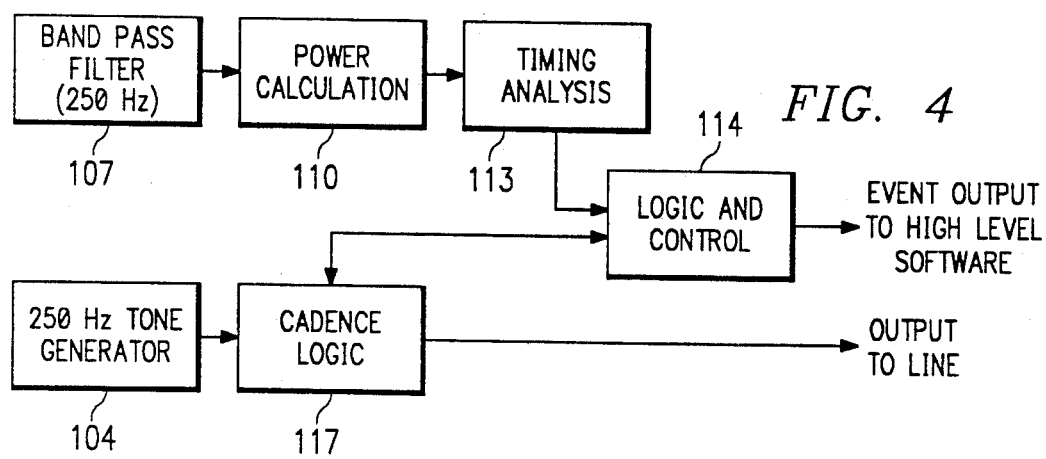

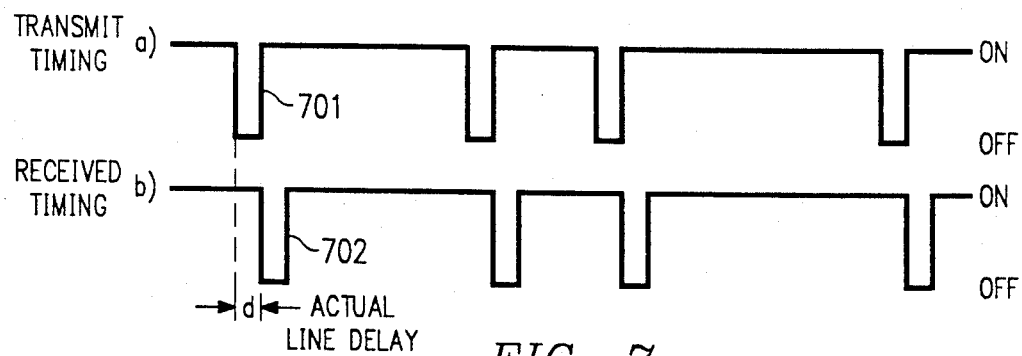
FIG. 7
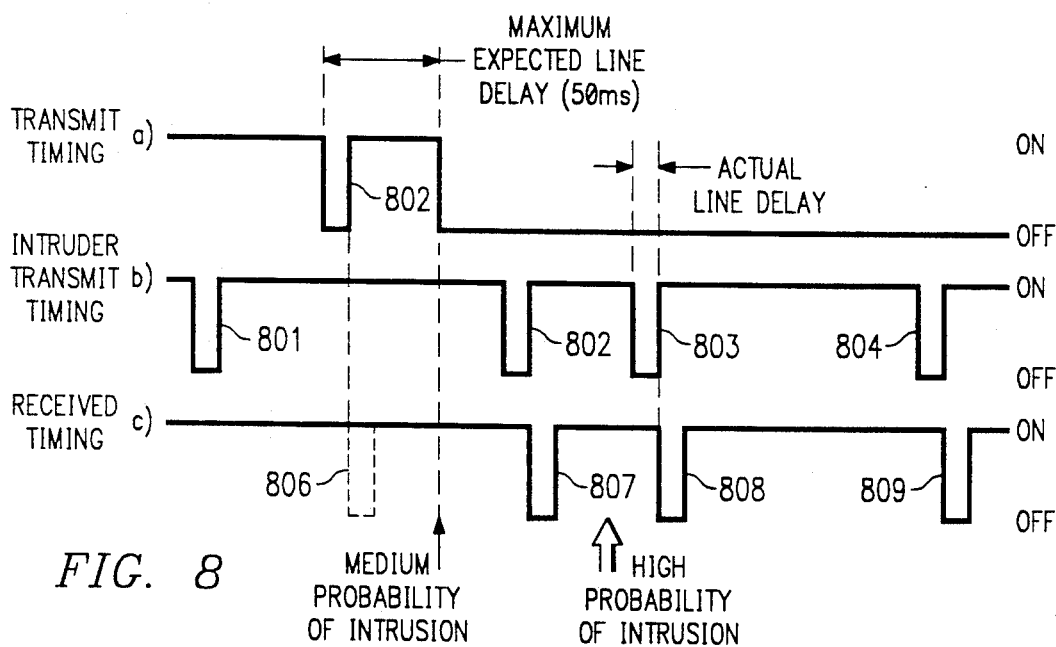
FIG. 8
FIG. 9
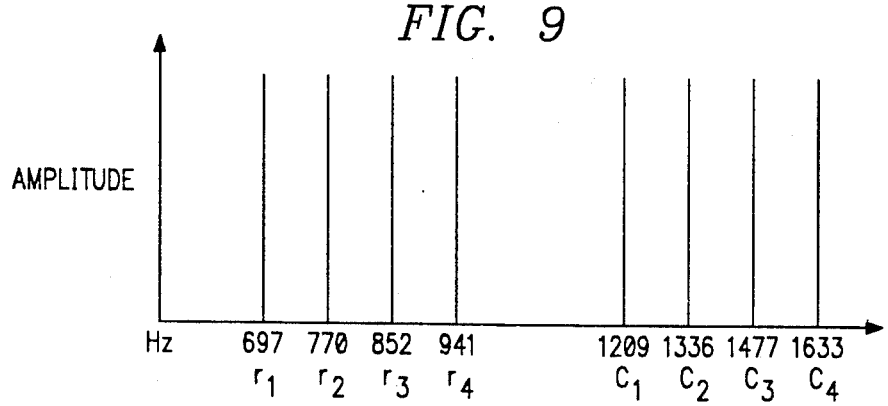

FIG. 10
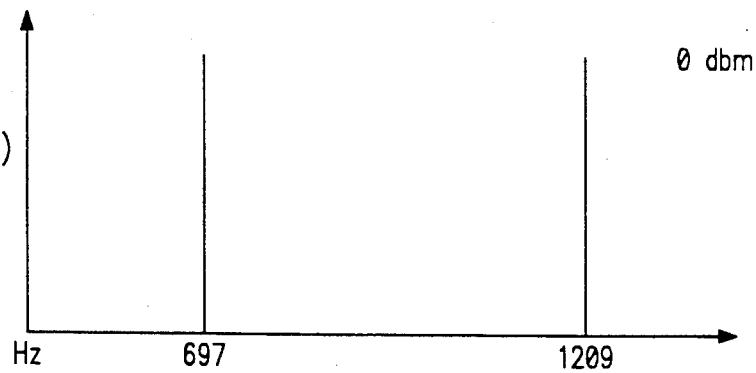
a) DTMF TRANSMITTED BY USER
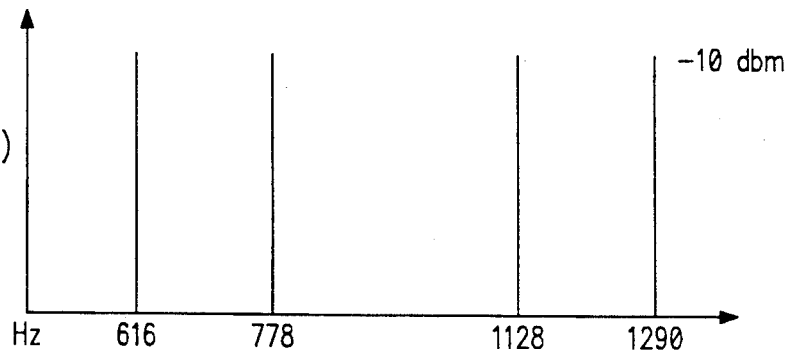
b) MODULATED SIGNAL TRANSMITTED BY PRIVATE SYSTEM
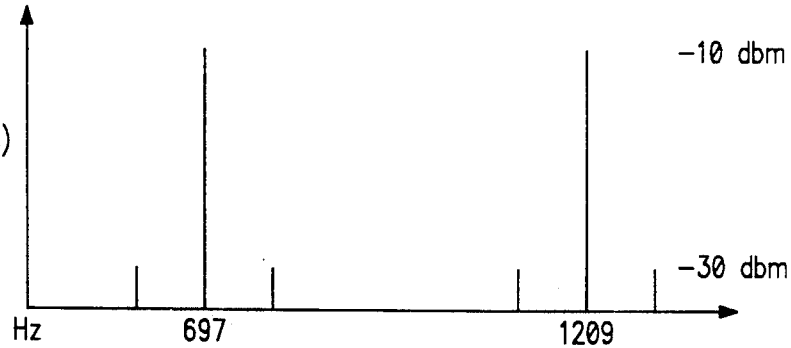
c) SIGNAL RECEIVED BY PRIVATE SYSTEM
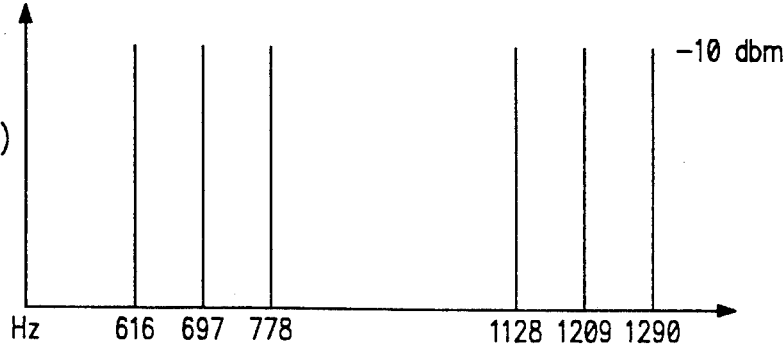
d) SIGNAL RECEIVED BY INTRUDER FIG. 11
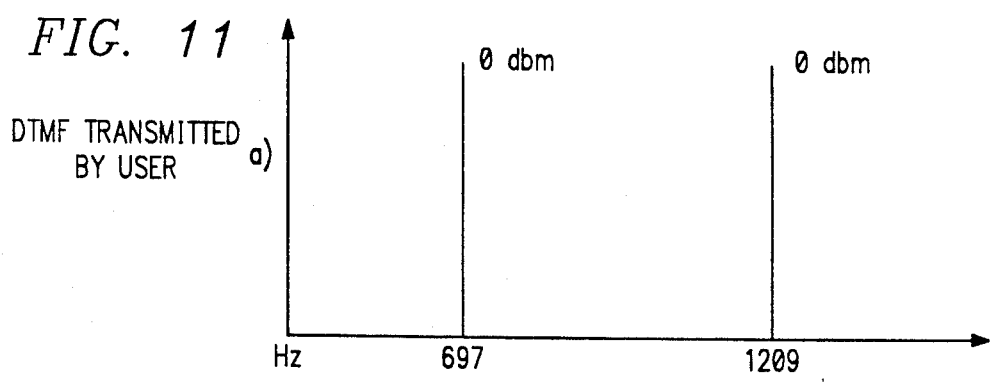
a) DTMF TRANSMITTED BY USER
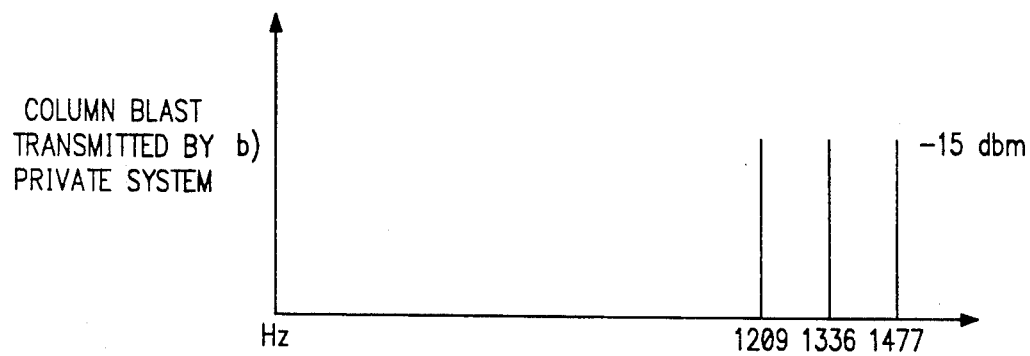
b) COLUMN BLAST TRANSMITTED BY PRIVATE SYSTEM
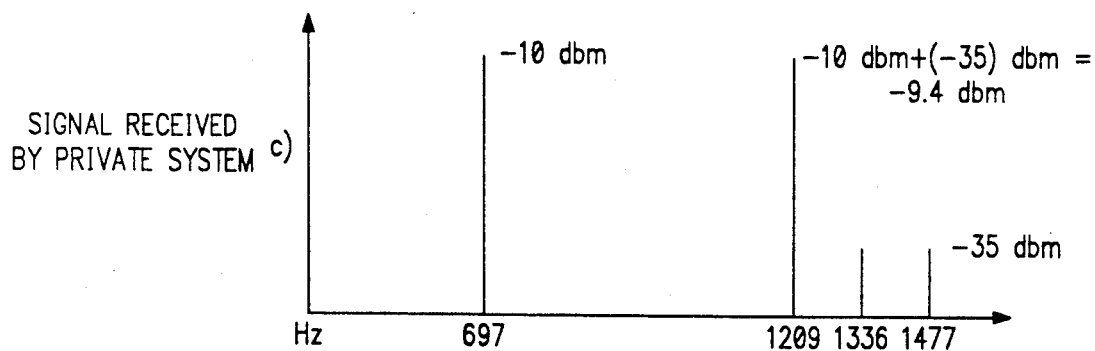
c) SIGNAL RECEIVED BY PRIVATE SYSTEM
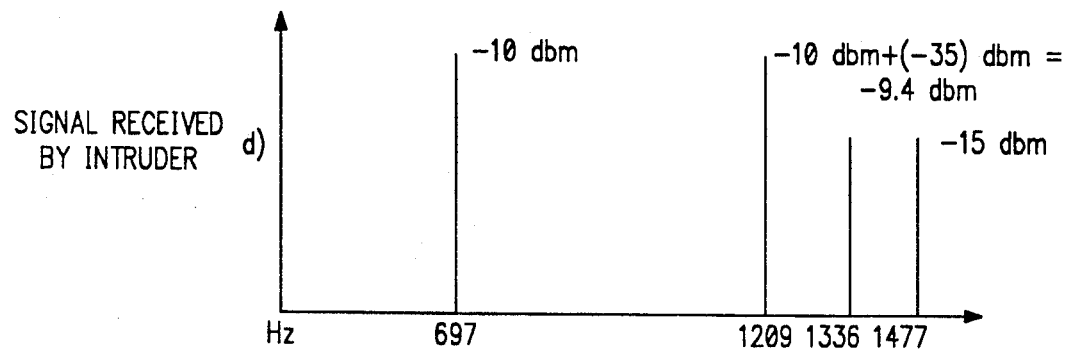
d) SIGNAL RECEIVED BY INTRUDER FIG. 12
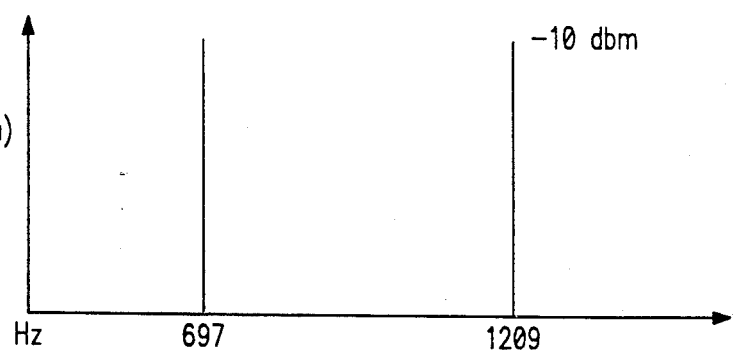
a) DTMF TRANSMITTED BY USER
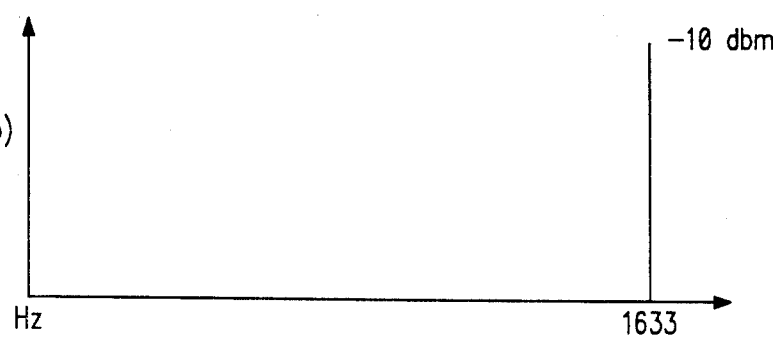
b) COLUMN MASKING TONE TRANSMITTED BY PRIVATE SYSTEM
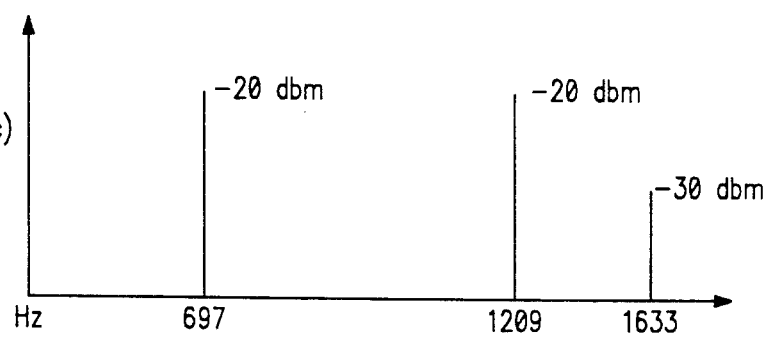
c) SIGNAL RECEIVED BY PRIVATE SYSTEM
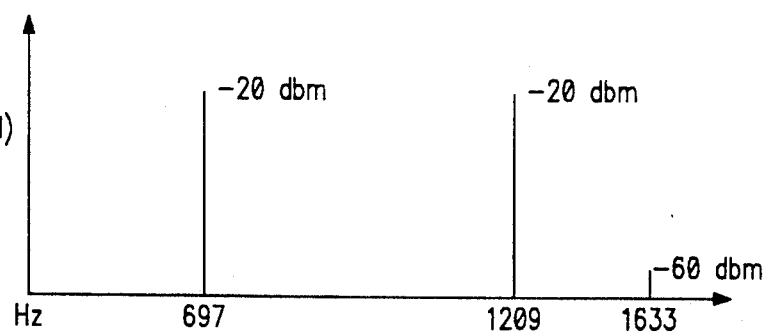
d) SIGNAL RECEIVED BY PRIVATE SYSTEM AFTER FILTERING
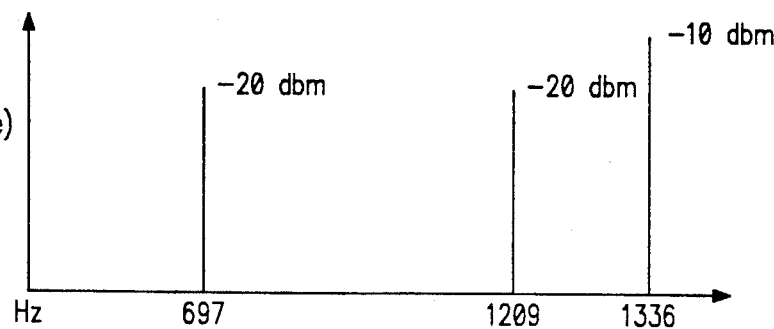
e) SIGNAL RECEIVED BY INTRUDER

METHOD AND SYSTEM FOR SECURE TELECOMMUNICATIONS

TECHNICAL FIELD OF THE INVENTION

This invention relates to secure telecommunications, and more particularly, to a method and system for decreasing the probability that an intruder can intercept tone encoded information on a telecommunication connection.

BACKGROUND OF THE INVENTION

It is becoming commonplace for users to access data, such as bank data, via a telephone connection. This access is accomplished by using the number keypad at a telephone and sending tone signals (dial tone multi-frequency DTMF tones) to an automatic response system. In the usual situation, these access systems require the user to send a specialized access code such as a personalized information number (PIN) together with the account number. An eavesdropper monitoring the telephone line then need only listen to the exchanged communication to gain knowledge of the user's account number and PIN. At a subsequent time the intruder can gain access to the user's file, perhaps transferring funds therefrom surreptitiously.

This problem is dealt with in the prior art. For example, U.S. Pat. No. 4,972,469 dated Nov. 20, 1990, shows a system that sends a masking signal on the line, thereby preventing an eavesdropper from using a conventional DTMF decoder and obtaining intelligent information from the transmitted tones. The '469 patent works by providing tones within the range of the DTMF valid tone range and by monitoring these tones to control the relative levels between the transmitted valid tones and the transmitted masking tones. Because the masking tones are within the range of valid tones, the unauthorized receiver is confused because at any one time there are more valid frequencies than are allowed, and thus the unauthorized receiver will automatically shut down. However, because the tones are known to the transmitting system, these tones can then be removed by a echo suppression type hybrid.

Prior systems have several problems. One is that they must continually adjust the masking tone levels to get a relative difference between the masking tone and the valid tone so that the masking tone can be removed without removing the valid tone information. Another problem exists in that these tones are provided in a manner which makes it unpleasant for a user since they are present on the line all the time and thus tend to be unpleasant to the ear.

In addition, an eavesdropper by recording the transmission will effectively record all of the masking tones. For example, in a banking application, the eavesdropper will have two options. The first option is for the intruder to call the bank and to play back the recorded account number and PIN identification. In some instances the bank system will filter out the masking tones thereby allowing the intruder to gain access to the bank system.

Option two would be for the intruder to analyze the extraneous frequencies, thereby removing designing a system which remove those frequencies. In addition, once the masking frequencies are known, it is an easy matter to identify the account and PIN information.

Accordingly, a need exists in the art for a secure system which will allow a system to function without adjustment of the signal level.

A further need exists in the art for a secure system which functions to prevent an eavesdropper who has taped the transmission from decoding the tape to obtain valid information.

A still further need exists in the art for a system which prevents a taped transmission from being played back to the control system at a later date so as to gain access to an account improperly.

SUMMARY OF THE INVENTION

These objects and problems have been resolved by a system which utilizes a combination of several techniques to prevent an unauthorized listener from obtaining encoded signal information telecommunication connection. The system in essence relies upon several concurrently different employer techniques that are utilized to reduce the probability that an unauthorized listener can obtain valid information from a DTMF communication exchange.

The first technique is the transmission of the masking signal as a valid signal within the DTMF frequency range. However, the signal that is sent is the 1633 hertz signal which is the column frequency associated with the fourth ('D') column is not presently utilized commercially. Thus, a valid signal is sent, and if not masked, would disable any spurious detector on the line. The system, however, uses a notch filter to take the masking signal completely off the line. The system, therefore, operates at any power level and does not require any adjustment of the masking signal level relative to the valid tone signal level.

The second method of masking is to send three valid frequencies at a certain fixed level. Because the "extra" tones are constant, they can easily be remedied by the cancellation circuit.

The third technique is to modulate all of the signals by 81 hertz, thus creating for every frequency sent two additional frequencies, one 81 hertz above the actual signal and one 81 hertz below the actual signal. Since in this case three signals would be coming in for every one sent, a normal DTMF receiver will block because of the extra "invalid" signals. These signals are determined to be "invalid" because they are 81 hertz above or below the "good" signal. The difference was selected since it is the approximate difference between the valid tone signals in the low range tones. Again, because known "extra" signals are being sent, hybrid echo cancellation can be used to filter these signals at the sending location. An intruder does not know the modulation frequency, and thus, cannot remove the spurious signals.

The fourth method is the placement of a signature tone on the line. This tone is outside of the band of valid tone signals, but is placed on the line at specific, but changing, times. Since the sending end knows the exact on and off times of these signals, the hybrid cancellation circuit will remove the signals from the received transmission. Similar to the first technique a notch filter is used to completely remove the signal on the receiving end before it is sent to the DTMF decoder. Intruders who attempt to record the tones for later playback are foiled because the playback will include these random tones which, at the time of playback, will be different from the pattern of tones then being utilized by the system.

The foregoing has outline rather broadly the features and technical advantages of the present invention in order that the detailed description of the invention that follows may be better understood. Additional features and advantages of the invention will be described hereinafter which form the subject to the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2 and 3 are diagrams which show power losses introduced by typical systems;

FIG. 4 shows a block diagram of a portion of the security system;

FIG. 7 shows a timing diagram of a telecommunication connection with no intrusions;

FIG. 8 shows a timing diagram of a telecommunication connection with intrusions;

FIG. 9 shows a graph of tone signals;

FIG. 10 shows the frequency analysis for the modulation signal;

FIG. 11 shows the frequency analysis for the column blast;

FIG. 12 shows the frequency analysis for the column masking tone; and

DETAILED DESCRIPTION OF THE INVENTION

Figure 1:
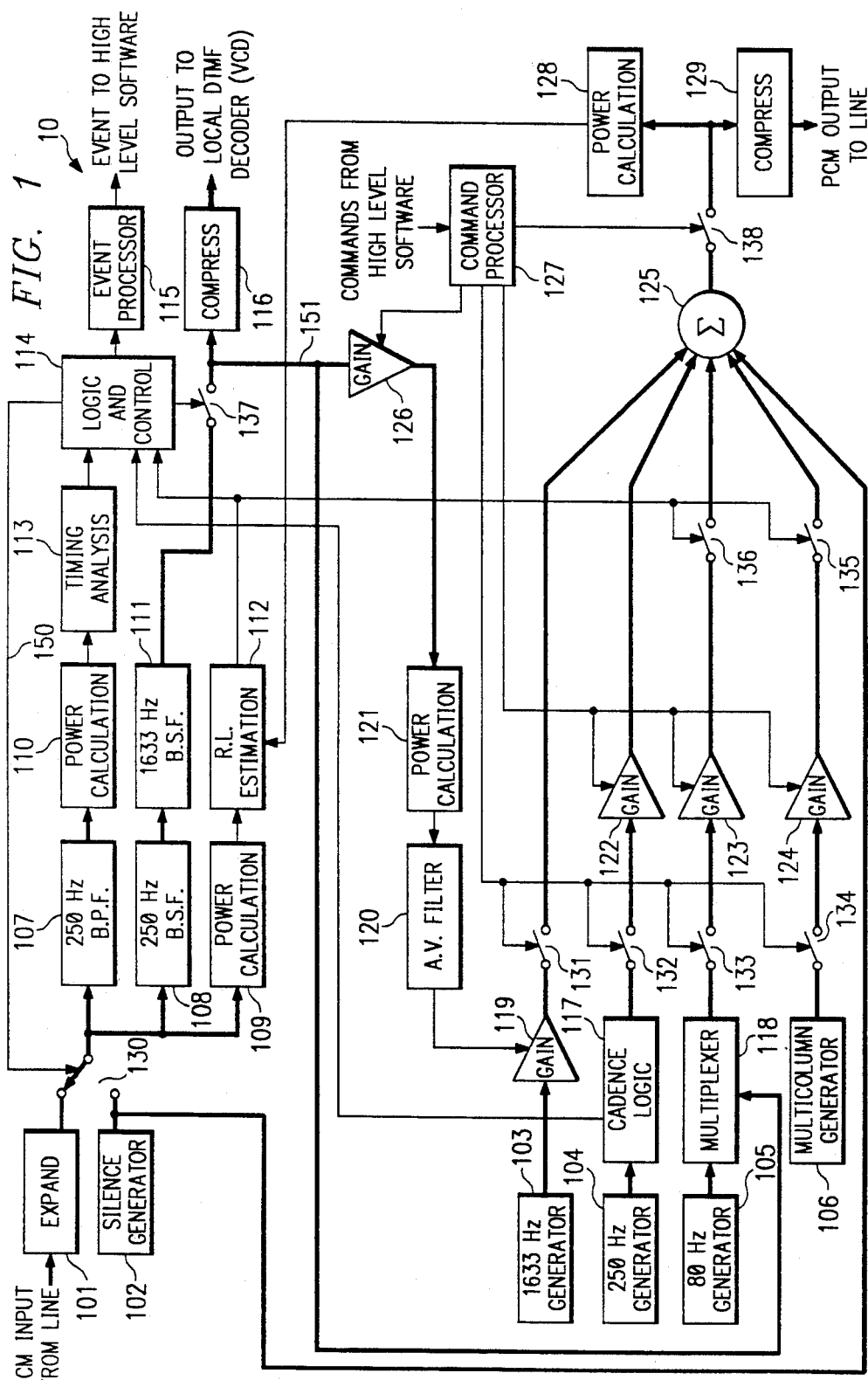
FIG. 1 shows an overall schematic diagram of the security system of the present invention.

FIG. 1 is one embodiment of system 10 which operates to prevent the interception of dual tone multifrequency (DTMF) tones imposed on a telephone line by a user. The various components of system 10 will be discussed with reference to the operation of the system with respect to each of the four methods of providing security. The heavy lines represent the transmission path while the light lines show control data flow.

Before discussing the four security methods and the system for preventing unauthorized usage, a brief discussion of background material will be helpful.

There are fundamentally three types of intrusions which can occur, each requiring a different method of protection.

TYPE 1: A recording device placed across the telephone line with the intention of playing the message back on subsequent phone calls. This device can be on either side of the line to the central office, as shown in FIG. 2.

TYPE 2: A DTMF decoder placed across the line to capture and decode the DTMF information as it is being transmitted for future use.

TYPE 3: A recording device placed across the line for the purpose of analyzing recorded fields with a spectrum analyzer to retrieve DTMF information.

Security system 10 uses different techniques in order to decrease the probability of intrusion from the three types described above.

The following DTMF specifications are helpful for a better understanding of the different techniques used within system 10.

1. The minimum time for a tone digit is 50 ms, with 50 ms of silence for inter-digit time.
2. Two column frequencies cannot be present at the same time within a received digit interval. If two column frequencies are present, with a power level difference of 6 db or less, both frequencies are disregarded as being a bad digit, irrespective of the validity of the row frequency. Likewise, two row frequencies cannot be present in the same digit interval at the same time.
3. The DTMF decoder should be able to decode digits within a 25 db dynamic range; digits between 0 dbm and −25 dbm should be accurately decoded.
4. The DTMF decoder should be able to correctly detect any digit, if it has 1.5% frequency shift or less. It should also reject any digit if it has 4.0% frequency shift or more.

FIGS. 2 and 3 show the typical power loss introduced by the system. In these FIGURES we assume that the power drop in central office 20 is 10 dbm and that the return loss of private system 24 via hybrid 21 is 20 dbm. Therefore, if a signal is transmitted by telephone user 201 at 0 dbm (FIG. 2), it is received by system 24 (receive line 22) at −10 dbm. Likewise, if a signal is transmitted by system 24, (FIG. 3) transmit line 23, at −10 dbm, it is received by the same system at −30 dbm.

FIG. 2 is similar to FIG. 3. The only difference is that in FIG. 2 the telephone user is transmitting a signal at 0 dbm and system 24 is not transmitting anything. In FIG. 3, system 24 is transmitting a signal at −10 dbm and the telephone user is not transmitting anything.

Figure 13:
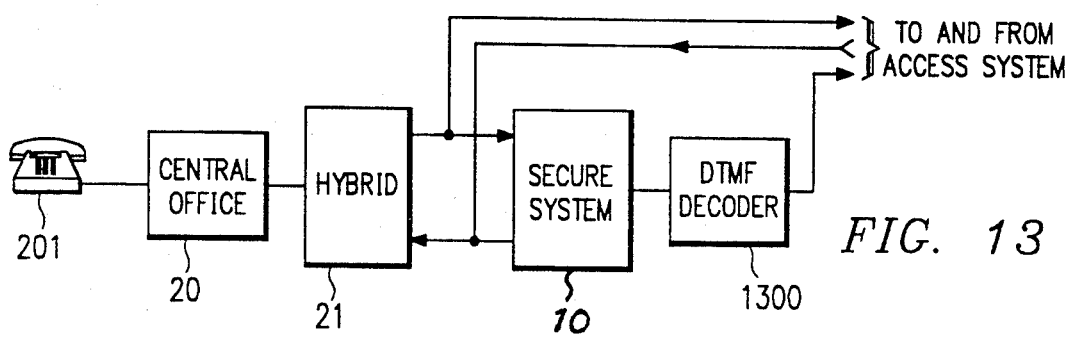
FIG. 13 shows the security system inserted into a telecommunication line.

System 10 is inserted into the line as shown in FIG. 13. System 10 has one input from the line and two outputs, one to the line and another to local DTMF decoder 1300. The output to DTMF decoder 1300 is a filtered version of the input coming from the line. Two filters (FIG. 1) are used: one notch filter 108 at 250 Hz and another notch filter 111 at 1633 Hz.

As shown in FIG. 13, DTMF 1300 communicates with the main access system of the bank, and after the decoding process is finished, the access system bypasses system 10 allowing for the transfer of data to and from the storage system (not shown) and user 201.

System 10 uses four different techniques in order to protect from the three types of intrusion described above. These four techniques are:

1. Signature tone.
2. Modulation signal.
3. Column blast tones.
4. Column masking tone.

Each of these techniques will be explained in the following sections.

Signature Tone

The purpose of this tone is to protect the telephone lines from an intrusion where a recording device is placed across the telephone line with the intention of playing the message back on subsequent phone calls.

The signature tone is a technique that gives each call its own signature. This technique is not restricted to DTMF, but instead, can be used in any data transmission circumstance in order to recognize if the message being recorded has been prerecorded or not.

A simplified logic of the signature tone is as follows:
1. Play a known frequency tone or group of frequencies with a specific cadence.
2. Detect the received cadence of the signal.
3. Compare the received cadence with the transmitted cadence.
4. If the cadence played is different than the cadence detected, then there is a probability of intrusion and a signal should be sent to the logic control circuit.

A simplified block diagram is shown in FIG. 4 which in essence is a portion of system 10, shown in FIG. 1.

FIG. 4 Explanation

Band pass (band stop) filter 107 is used to isolate the signal at 250 Hz. Power calculation 110 calculates the power of the received signal within the 250 Hz range and generator 104 generates 250 Hz tone.

Figure 5:
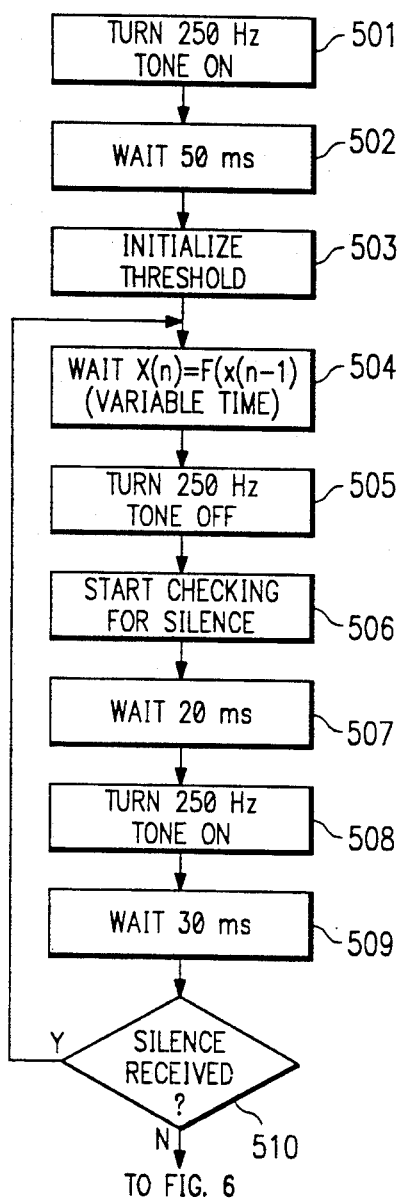
FIGS. 5 and 6 show flow charts of system operation.
Figure 6:
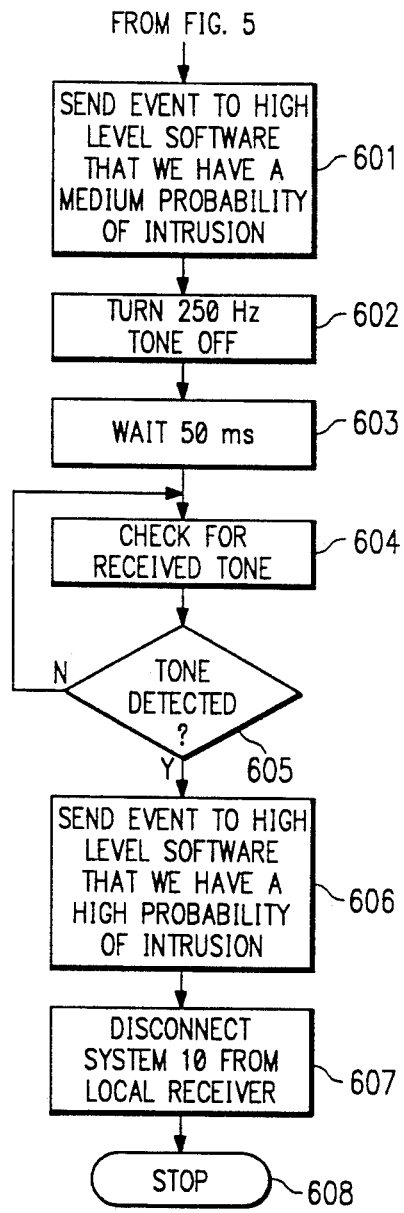

Blocks 113, 114 and 117 of FIG. 4 are represented by blocks 504, 505-510, 601, 602 to 608 of FIGS. 5 and 6.

Timing analysis block 113 is responsible for detecting the cadence incoming from the line. Cadence logic block 117 is responsible for generating the variable cadence.

Logic and control block 114 is responsible for controlling the overall flow of the program.

The logic of the signature tone is shown in FIGS. 5 and 6 and is as follows:

At the beginning of each call, block 501, send a continuous tone, block 502, at 250 Hz and detect the received signal in order to establish, the return loss, block 503 and therefore establish the level threshold at which to establish ON or OFF.

Play the 250 Hz tone with an off time equal to 20 ms and on time (ont) given by ont=X(n)+Y ms where X(n) =mod512(X(n-1)+17) and Y is the maximum time delay introduced in the telephone lines. This cadence has been specifically chosen in order to increase the number of signatures. This choice of cadence will give the intruder a probability of 1/13500 in order to hit the right cadence. In other words, if an intruder records the message and tries to play it back in subsequent calls, the probability that system 10 will not realize that the message is prerecorded is 1/13500.

After every silence played (outbound), check for silence received, block 510.

If silence is not received within 50 ms (maximum time delay introduced by the telephone lines), turn off the 250 Hz signal completely and send, block 601 to high level software (control) that there is a medium probability of intrusion.

If silence is received, then go to block 504.

If there is a medium probability of intrusion and the transmission signal is off and there is detected a receive signal for more than 50 ms, block 603, then shut down the output to the local DTMF decoder, send to the high level software that there is a high probability of intrusion, block 606 and disconnect system 10, block 607, from the receiver.

Typical timing of the 250 Hz signal is shown in FIGS. 7 and 8.

FIGS. 7 and 8 are a direct result of FIGS. 5 and 6. FIG. 7 occurs when there is no intruder on the line. In this case, the flow of the program (FIG. 5) goes from block 504 to 510 and back to block 504.

As shown in FIG. 7a, a 250 Hz tone is transmitted on the line with the cadence shown. The off line is constant and the on line is variable.

When we transmit this cadence, we expect to see the same cadence returned to the system but with a delay (d) introduced by the line.

FIG. 7b represents the received cadence, which is simply a delayed version of the transmitted cadence. When the transmitter is turned off, we expect to detect an "off" cadence within 50 ms. This actually happens because there is no intruder on the line.

FIG. 8 represents the case where there is an intruder on the line. In this case, we transmit a specific cadence, and the intruder is transmitting a different cadence. The received cadence is a combination of the delayed transmitted cadence and the intruder's cadence.

cadence received  =  cadence transmitted +
                     cadence of the intruder When silence is transmitted (802) we expect to receive silence (806) within 50 ms (maximum expected line delay). If we do not detect any silence within 50 ms, this means that somebody else (the intruder) is also transmitting this frequency. At this time, we turn off the transmit cadence completely and we report to the high level software that there is an intruder on the line.

If we keep detecting a tone, even after we completely disable the transmit cadence, then we report to the high level software that we have a high probability of intrusion. At this time, the input from the line is disregarded.

System 10, FIG. 1, elements 104, 117, 132, 122, 125, 127, 129, 101, 130, 107, 108, 110, 113, 114, 115, 137 and 116 perform this signature operation.

Element 104 is a 250 hz tone generator. Element 132 is a switch that allows the high level software to have the flexibility to enable or disable the signature tone technique. Element 122 is a gain controller that gives the high level software the control over the output power level of the signature tone. This is normally changed in order to meet certain specifications (example CCITT specifications). Element 125 is a summing block. Element 127 is a processor that controls the input commands from the high level software, and translates these commands to their proper meaning. It is responsible for 1—Turning system 10 ON and OFF.
2—Initializing the software.
3—Controlling the output power level.
4 — Turning ON and OFF the four different techniques of system 10.

Element 129 changes the format of the data from LINEAR to PCM ALAW or CPM MULAW. Element 101 changes the format of the data from PCM ALAW or PCM MULAW to LINEAR. Element 130 is a switch used to disconnect the input from the line and connect it to ground (silence generator). This is used for initialization purposes. Element 107 is a 250 hz band pass filter. This filter is used to isolate the information with the 250 hz range. The output of this filter is subsequently used in the timing analysis of the signature tone. Element 108 is a 250 hz band stop filter. This filter is used to suppress all tones within the 250 hz range. The output of the filter is then passed to a 1633 hz filter, and finally, the output is sent to the local DTMF decoder or receiver. This filter is used in order to eliminate, (or minimize) any effect the signature tone has on the received signal. Element 110 is a power calculation block, the output of which is subsequently used in the timing analysis of the signature tone. Element 113 is a timing analysis block (FIGS. 4, 5 and 6). Element 114 is a logic and control block (FIGS. 4, 5 and 6). Element 115 is an event processor. This block is responsible for sending the status of system 10 to the high level software. Element 137 is a switch used in order to disconnect the output from the local DTMF decoder. This is done only if we have a high probability of intrusion. Element 116 is a compress block and is the same as block 129.

Advantageously, the tone played is 250 Hz for three reasons:
1. A low frequency tone is normally more pleasant than a high frequency tone.
2. A tone at 250 Hz will not be in the DTMF frequency range nor in the call progress frequency range.
3. 250 Hz has a cycle of exactly 32 samples. This makes it very easy to generate because the data buffers used are also multiples of 32. This will enable use of the 250 Hz sine generator without any usage of processor time.

Because the return loss might be different from one call to another, the return loss is calculated every time system 10 is turned on. This will enable the system to have a different threshold for each call. This threshold is used to decide if the 250 Hz tone is ON or OFF.

For purposes of detection, it is possible to add data to the cadence by using the on-off cadence to code a date or a time. or a location. Simple Morse code could be used as well as a more complex code. In addition, the frequency which is provided to the line could be modulated by the application. (via a simple AM or FM modulation) of coded intelligence thereto.

Modulation Signal

The purpose of this tone is to protect the telephone lines from an intrusion by a recording device placed across the line for the purpose of analyzing recorded fields with a spectrum analyzer to retrieve DTMF information.

The idea is to use very low carrier frequency AM (Amplitude Modulation). The amplitude modulator will have a frequency of 81 Hz, 141 Hz, or both. In the first implementation of the algorithm, only one (81 Hz) modulation frequency is used.

As shown in FIG. 9, the choice of these two frequencies is chosen such that it will maximize the confusion of the intruder by making the modulated signal closest to the other row and column frequencies. Any DTMF tone generated on the transmitter side will be automatically jammed by other frequencies close to the real one, therefore, any digit generated by the user will appear to the intruder as six frequencies. This is explained in the following paragraph.

We use the following simple trigonometric formula:

$$\cos(x) * \cos(y) = \tfrac{1}{2} * \cos(x+y) + \tfrac{1}{2} * \cos(x-y)$$

In the case where the user sends DTMF digit 1 (frequencies 697 and 1209) and we modulate by 81 Hz, we get the following:

The user is transmitting a DTMF tone (assumed digit 1):

$$f_{user}(t) = A * \cos(697t) + B * \cos(1209t)$$

If the power drop in the central office is 10 db, then the received signal from the user is given by:

$$f_{user\ received}(t) = C * \cos(697t) + D * \cos(1209t)$$

where $$C = A \sqrt{10} \quad D = B \sqrt{10}$$

The modulated signal (multiplied by 2) is given by:

$$\begin{aligned} f_{output} &= f_{user\ received} * \cos(81t) * 2 \\ &= C*\cos(616t) + C*\cos(778t) + \\ &\quad D*\cos(1128t) + D*\cos(1290t) \end{aligned}$$

The intruder (on the private system's side of the central office) will receive:

$$\begin{aligned} f_{intruder}(t) &= f_{output}(t) + f_{user\ received} \\ &= C*[\cos(616t) - \cos(697t) - \cos(778t)] - \\ &\quad D*[\cos(1128t) + \cos(1209t) - \cos(1290t)] \end{aligned}$$

The private system will receive:

$$\begin{aligned} f_{system}(t) &= f_{output}/10 - f_{user\ received} \\ &= C*[0.1*\cos(778t) - \cos(697t) - \\ &\quad 0.1*\cos(616t)] - \\ &\quad D*[0.1*\cos(1128t) - \cos(1209t) - \\ &\quad 0.1*\cos(1290t)] \end{aligned}$$

The difference between f_intruder(t) and f_system(t) is due to the hybrid of the system that will ensure that the reflection of the signal transmitted by this system is attenuated by 20 db.

The intruder will get six frequency signals, we will focus on only two of them: 697 and 778. In this case, the user transmitted a 697 signal (first row frequency). The intruder received 697 and 778, with equal power levels. The second frequency is very close (approximately 1.03%) to the second row frequency (770 Hz). This will create a confusion on the intruder's side.

FIG. 10 shows the frequency analysis for the modulation signal.

FIG. 10a represents the frequency response of the transmitted signal, transmitted by the user. In this case we assume that the user is dialing digit 1 (697 hz and 1209 hz). For simplicity, the output power level per frequency is assumed to be 0 dbm. FIG. 10b represents the signal transmitted by system 10. This represents the modulated received signal (modulation of the modulated signal received due to return loss is omitted). FIG. 10c represents the signal received by system 10, assuming a return loss of 20 dbm. FIG. 10d represents the frequency response of the signal received by the intruder, assuming that the intruder is located on the near (control system) end of the central office.

System 10, FIG. 1, elements 101, 130, 108, 109, 112, 111, 137, 116, 105, 133, 123, 127, 125, 129 and 128 perform this function.

Element 109 is a power calculation block. This block calculates the input power level. The output of this block is subsequently used in order to estimate the power loss in the system. Element 128 is a power calculation block. This block calculates the output power level. The output power level is subsequently used in order to estimate the return. Element 112 is a return loss block. This block compares the output of blocks 128 and 109 and estimates the return loss accordingly. Element 105 is a 81 hz tone generator. Element 118 modulates the input signal with the 81 hz tone. Element 133 is a switch that gives the high level software the flexibility to enable or disable the modulation signal technique. Element 123 is a gain controller that gives the high level software the control over the output power level of the modulated signal. This is normally changed in order to meet certain specifications (example CCITT specifications).

A return loss analysis block 112 is available in system 10. This block is used in order to estimate the value of the return loss for each call. If the return loss is small, then the modulation signal is automatically disabled.

Column Blast

The purpose of this tone is to protect the telephone lines from an intrusion when a DTMF decoder is placed across the line and the DTMF information is captured for future use, and where a recording device is placed across the line for the purpose of analyzing recorded fields with a spectrum analyzer to retrieve DTMF information.

The idea behind the column blast is to play the three or four column frequencies all at the same time. The output power of each signal should be fixed at −15 db to −20 db. If the return loss is 20 db or better, we receive this signal on our end, but attenuated by 20 db. Thus, we receive the signal at −35 db to −40 db. Since the DTMF decoder operation requirements are 0 to −25 db and an erroneous column frequency should be at least 6 db lower than the right DTMF column frequency, therefore this tone will not affect our DTMF decoder. But it will greatly affect a DTMF decoder located on the line, specially if it is located on the system's end of the central office as shown in FIG. 10.

Since this column blast performance is greatly affected by the return loss, we must calculate the return loss on the fly for each call. If this loss is not good enough, this masking technique is automatically disabled.

The frequency analysis for the column blast is found in FIG. 11.

FIG. 11a represents the frequency response of the transmitted signal, transmitted by the user. In this case we assume that the user is dialing digit 1 (697 hz and 1209 hz). For simplicity, the output power level per frequency is assumed to be 0 dbm. FIG. 11b represents the signal transmitted by system 10 for the column blast technique. Typically, the output power of each frequency is between −15 dbm and −25 dbm. The higher the output power, the higher the security. The lower the output power, the more pleasant is the signal. However, if the output power is very high, it might affect the local receiver. FIG. 11c represents the frequency response of the signal received by system 10, assuming a return loss of 20 dbm. FIG. 11d represents the frequency response of the signal received by the intruder, assuming that the intruder is located on the near (control system) end of the central office.

System 10, FIG. 1, elements 101, 130, 108, 111, 109, 112, 116, 106, 134, 124, 125, 127, 128 and 129 perform this function.

Element 106 is a column blast generator which generates 3 or 4 column frequencies. Element 133 is a switch that gives the high level software the flexibility to enable or disable the column blast technique. Element 123 is a gain controller that gives the high level software the control over the output power level of the column blast signal. This is normally changed in order to meet certain specifications.

Column Masking Tone

The purpose of this tone is to protect the telephone lines from an intrusion where a DTMF decoder is placed across the line and the DTMF information is captured for future use.

This technique is the most efficient technique used against DTMF decoders placed on the line.

A tone at 1633 hz is played at the maximum level allowed by the telephone company. This signal is located exactly at the fourth column frequency which is not currently used for determining digit transmission information. The received signal then passes through a 1633 Hz filter. This filter removes any signal in this frequency range. Therefore, the part of the signal that is received is prefiltered before it goes to the DTMF decoder, and thus the local DTMF decoder is not affected by this signal at all.

On the contrary, the intruder DTMF decoder is located on the line will receive the 1633 Hz tone, and therefore, will block when a secured column frequency (good information) is provided.

By filtering any signal in the 1633 Hz range, our DTMF decoder will not be able to decode the DTMF signal. However, in most practical circumstances these signaling tones are not used at all.

In order to make this tone more pleasant to the user's ear, it is not set unless there is detected some energy from the line. Thus, the output level of this signal is directly related to the input power. An averaging filter is added to the circuit in order to prevent oscillation.

The frequency analysis of the column masking tone is found in FIG. 12.

FIG. 12a represents the frequency response of the transmitted signal, transmitted by the user. In this case we assume that the user is dialing digit 1 (697 hz and 1209 hz). For simplicity, the output power level per frequency is assumed to be −10 dbm. FIG. 12b represents the signal transmitted by system 10. This represents the column masking tone signal used. FIG. 12c represents the signal received by system 10, assuming a return loss of 20 dbm. FIG. 12d represents the signal received by system 10 after passing through the local filter. The local filter will remove any of the 1633 hz tone signal remaining that has been reflected to us. FIG. 12e represents the frequency response of the signal received by the intruder, assuming that the intruder is located on the near (control system) end of the central office.

System 10, FIG. 1, elements 101, 130, 108, 111, 116, 103, 119, 131, 120, 121, 126, 151, 127, 125, 129.

Element 103 is a 1633 hz tone generator. Element 119 is used for controlling the output of the 1633 hz generator in function of the input power. This is done in order to make it more pleasant to the user. Element 131 is a switch that gives the high level software the flexibility to enable or disable the column masking tone. Element 121 is a power calculation block. Element 120 is an averaging filter. This filter has been added for practical purposes. It will eliminate any possible oscillation introduced by the column masking tone. Element 126 is a gain controller that gives the high level software the control over the output power level of the column masking tone. This is normally changed in order to meet certain specifications (example CCITT specifications). Element 108 is a 1633 hz band stop filter. This filter is used to suppress all tones within the 1633 hz range. The output of the filter is sent to the local DTMF decoder or receiver. This filter is used in order to eliminate (or minimize) any affect the column masking tone has on the received signal.

The use of the signature tone does not rely on a good return loss. This technique does not rely on any hybrid performance, and therefore, it can be equally efficient in the case where the system receives the signal on a 4-wire basis directly from the central office. One example of a 4-wire operation would be in the form of T1 signal.

Similarly, the column masking tone operates efficiently under the same conditions discussed above. Its performance decreases in the case where the intruder is located on the 4-wire side of the central office.

Also, it should be noted that the system can and will work with all techniques operating or with any combination of techniques or even with one technique. However, maximum protection is achieved when all the techniques are used in combination.

Although the present invention and its advantages have been described in detail, it should be understood that various changes, substitutions and alterations can be made herein without departing from the spirit and scope of the invention as defined by the appended claims.

What is claimed is:

1. A system for insertion on a communication path between a user sending sensitive data and a receiver at a control point in said path for accepting said sensitive data, said system comprising:
   means fully located at said control point of said path for sending on said path known signals having a known on-off cadence;
   means for monitoring transmission received from said user for the presence of said known signals; and
   means for providing a signal representative of a possible intrusion on said line when said monitored transmission has present thereon said known signals during a known off time of said known signal cadence.

2. The system set forth in claim 1 further comprising:
   means for changing said cadence at irregular intervals of time.

3. The system set forth in claim 1 further comprising:
   means for changing said known signals at irregular intervals of time.

4. The system set forth in claim 1 further comprising:
   means for imposing information content on said signals.

5. The system set forth in claim 1 wherein said signal removing means further comprises:
   means for turning off said cadence; and
   means operative upon receipt of said known signals after said cadence has been turned off for a period of time for providing a second signal representative of a high degree of probability of an intruder on said line.

6. The system set forth in claim 5 further comprising:
   means for determining from repetitive comparisons of said sent and received cadences the probability of an intrusion on said path.

7. The system set forth in claim 1 further comprising:
   means for adjusting the power level of said transmitted known signals depending upon the return loss of said communication path.

8. The system set forth in claim 1 wherein said path includes a hybrid circuit at said control point and wherein said hybrid is inserted between said receiver and said path to said user.

9. A system for insertion on a communication path between a user sending sensitive data and a receiver at a control point in said path for accepting said sensitive data, and wherein said sensitive data is transmitted within a frequency spectrum, said system comprising:
   means fully located at said control point of said path for modulating any signal received at said control point;
   means collocated with said modulating means for retransmitting said modulated signal over said path thereby creating false information signals on said path; and
   means concurrently operative with said modulating means for detecting a valid signal irrespective of said modulated signal on said path.

10. The system set forth in claim 9 wherein said frequency spectrum is the DTMF spectrum and wherein said modulation means operates with a modulation frequency at the average frequency separation between valid DTMF signals.

11. The system set forth in claim 10 wherein said modulation frequency is 81 Hz.

12. The system set forth in claim 10 wherein said modulation is performed at a plurality of modulation frequencies.

13. The system set forth in claim 9 wherein said modulated signals are attenuated by a hybrid located between said user and control point.

14. A system for insertion on a communication path between a user sending sensitive data and a receiver at a control point in said path for accepting said sensitive data, wherein said sensitive data is transmitted at one or more of the discrete frequencies within the DTMF frequency spectrum; and wherein a transmission from said receiver results in a reflected transmission back to the receiver, said reflected transmission having a return loss associated therewith, said system comprising:
   means at said control point for applying a plurality of discrete frequencies on said path, each such frequency being identical with a particular discrete DTMF frequency and having a known and specific power level;
   means, including the return loss of said communication path, for removing said applied known frequencies from said connection;
   means for monitoring said return loss; and
   means controlled by said monitoring means for disabling said applying means, when said return loss falls below a specific level.

15. A system for insertion on a communication path between a user sending sensitive data and a receiver at a control point in said path for accepting said sensitive data; wherein said sensitive data is transmitted at one or more of the discrete frequencies within the DTMF frequency spectrum, said system comprising:
   means at said control point for applying to said communication path a frequency corresponding to one of said DTMF frequencies; and
   means collocated with said applying means for band-stop filtering said applied frequency from the reflected transmission from said communication path.

16. The system set forth in claim 15 wherein said applied frequency is the fourth column frequency of said DTMF discrete frequencies.

17. The system set forth in claim 15 further comprising:
means for applying said frequency only when any frequency within said DTMF bandwidth is present on said communication path.

18. A system for insertion on a communication path between a user sending sensitive data and a receiver at a control point in said path for accepting said sensitive data; wherein said sensitive data is transmitted at one or more of the discrete frequencies within the DTMF frequency spectrum; and wherein a transmission from said receiver results in a reflected transmission back to said receiver, said reflected transmission having a return loss associated therewith, said system comprising:
means at said control point for applying the following signals to said communication path:
a) a signature signal having a non-DTMF frequency and a controllable cadence;
b) a modulating frequency signal for modulating any detected signal to create extra transmitted frequencies;
c) a plurality of discrete DTMF signals having a known power level coordinated with the loss characteristics of said communication path hybrid; and
d) a frequency corresponding to a non-used one of said DTMF frequencies;
means at said control point for monitoring said received signals for a comparison of transmitted signature signal cadence with said received signals;
means, including the return loss of said communication connection from a user, for removing said applied known frequencies from said path; and
means for band stop filtering said applied non-used DTMF frequency from the reflected transmission from said communication path.

19. The system set forth in claim 18 further comprising:
means for changing said cadence from time to time.

20. The system set forth in claim 18 further comprising:
means for determining from repetitive comparisons of said sent and received cadences the probability of an intrusion on said path.

21. The system set forth in claim 18 wherein said modulation means operates to modulate with a frequency at the average frequency separation between valid DTMF signals.

22. The system set forth in claim 21 wherein said modulation frequency is 81 Hz.

23. The system set forth in claim 21 wherein said modulation is performed at a plurality of modulation frequencies.

24. The system set forth in claim 18 wherein said applied frequency is the fourth ('D') column frequency of said DTMF discrete frequencies.

25. The system set forth in claim 18 further comprising:
means for applying said used DTMF frequency only when power is present on said communication path.

26. A system for insertion on a communication path between a user sending sensitive data and a receiver at a control point in said path for accepting said sensitive data, and wherein said sensitive data is transmitted within a frequency spectrum, and wherein a transmission from either said sender or said sending receiver results in a reflected transmission back to the sending party, said system comprising:
means for sending on said path one or more known signals having a known cadence;
means for comparing said transmitted signal cadence with any received signal cadence; and
means for providing an indication of tampering when the transmitted signal cadence does not match any received cadence.

27. The system in claim 26 wherein said comparing means is operative during the off time of said signal cadence plus a line delay compensation time.

28. The system set forth in claim 26 further comprising:
means for changing said cadence aperiodically.

29. The system set forth in claim 26 further comprising:
means for changing said signals aperiodicaly.

30. The system set forth in claim 26 further comprising:
means for imposing information content on said signal.

31. The system set forth in claim 26 further comprising:
means for determining from repetitive comparisons of said sent and received cadences the probability of an intrusion on said path.

32. The system set forth in claim 26 further comprising:
means for modulating any frequency transmitted on said path thereby creating false information signals.

33. The system set forth in claim 32 wherein said frequency spectrum is the DTMF spectrum and wherein said modulation means operates with a modulation frequency at the average frequency separation between valid DTMF signals.

34. The system set forth in claim 33 wherein said modulation frequency is 81 Hz.

35. The system set forth in claim 33 wherein said modulation is performed at a plurality of modulation frequencies.

36. The system set forth in claim 26 wherein said frequency spectrum is the DTMF spectrum and wherein said system further comprises:
means for applying a plurality of discrete frequencies on said path, each such frequency being identical with a particular discrete DTMF frequency and having a known and specific power level;
means, including the return loss of said communication path, for removing said applied known frequencies from said path;
means for monitoring said return loss; and
means controlled by said monitoring means for disabling said applying means, when said return loss fails below a specific level.

37. The system set forth in claim 26 wherein said frequency spectrum is the DTMF spectrum and wherein said system further comprises:
means for applying to said communication path a frequency corresponding to one of said DTMF frequencies; and
means for band-stop filtering said applied frequency from the reflected transmission from said communication path.

38. The system set forth in claim 37 wherein said applied frequency is the fourth column frequency of said DTMF discrete frequencies.

39. The system set forth in claim 37 further comprising:
means for applying said frequency only when any frequency within said DTMF bandwidth is present on said communication path.

40. A security system including:
a user source for sending secure and non-secure information;
a control system for accepting, decoding and processing said secure and non-secure information;
a communication path connecting said user source and said control system, said control system including:
means for sending over said communication path known signals having a known on-off cadence;
means for monitoring transmission received from said user for the presence of said known signals; and
means for ending communication over said path from said user to said control system when said monitored transmission contains known cadence signals during the off period of said signal cadence.

41. The system set forth in claim 40 wherein said off-period includes a period after said on-time equal to the communication path reflected signal delay time.

42. A security system including:
a user source for sending secure and non-secure information;
a control system for accepting, decoding and processing said secure and non-secure information;
a communication path connecting said user source and said control system, said control system including:
means for modulating any signal received at said control point;
means collocated with said modulating means for retransmitting said modulated signal over said path thereby creating false information on said path; and
means concurrently operative with said modulating means for detecting a valid signal irrespective of said modulated signal on said path.

43. A security system including:
a user source for sending secure and non-secure information;
a control system for accepting, decoding and processing said secure and non-secure information;
a communication path connecting said user source and said control system, said control system including:
means for applying a plurality of discrete frequencies on said path, each such frequency being identical with a particular discrete DTMF frequency and having a known and specific power level;
means, including the return loss of said communication path, for removing said applied known frequencies from said connection;
means for monitoring said return loss; and
means controlled by said monitoring means for disabling said applying means, when said return loss falls below a specific level.

44. A security system including:
a user source for sending secure and non-secure information;
a control system for accepting, decoding and processing said secure and non-secure information;
a communication path connecting said user source and said control system, said control system including:
means for applying to said communication path a frequency corresponding to one of said DTMF frequencies; and
means collocated with said applying means for band-stop filtering said applied frequency from said communication path.

45. A method for detecting transmission security breaches on a communication path between a user sending data and a receiver at a control point in said path for accepting said data, said method comprises the steps of:
sending on said path known signals having a known on-off cadence;
monitoring transmission received from said user for the presence of said known signals; and
providing a signal representative of a possible intrusion on said line when said monitored transmission has present thereon said known signals during a known off time of said known signal cadence.

46. The method set forth in claim 45 further comprising the step of:
changing said cadence aperiodically.

47. The method set forth in claim 45 further comprising the step of:
changing said known signal aperiodically.

48. The method set forth in claim 45 further comprising the step of:
imposing information content on said signal.

49. The method set forth in claim 45 further comprising the step of:
determining from repetitive comparisons of said sent and received cadences the degree of probability of a said breach.

50. A method for detecting transmission security breaches on a communication path between a user sending data and a receiver at a control point in said path for accepting said data, said method comprises the steps of:
modulating any signal received at said control point;
retransmitting said modulated signal over said path thereby creating false information signals on said path; and
detecting simultaneously with said signal modulation a valid signal irrespective of said modulated signal on said path.

51. The method set forth in claim 50 further comprising the step of:
attenuating said modulated signals by a hybrid located between said user and said control point.

52. The method set forth in claim 50 wherein said frequency spectrum is the DTMF spectrum and wherein said modulation step operates with a modulation frequency at the average frequency separation between valid DTMF signals.

53. The method set forth in claim 52 wherein said modulation frequency is 81 Hz.

54. The method set forth in claim 50 further comprising the step of:
performing said modulation at a plurality of modulation frequencies.

55. A method for detecting transmission security breaches on a communication path between a user sending data and a receiver at a control point in said path for accepting said data, said method comprises the steps of:
applying a plurality of discrete frequencies on said path, each such frequency being identical with a particular discrete DTMF frequency and having a known and specific power level;

removing, via the return loss of said communication path, said applied known frequencies from said connection;

monitoring said return loss; and disabling, under control of said monitoring means, said applying step when said return loss fails below a specific level.

56. A method for detecting transmission security breaches on a communication path between a user sending data and a receiver at a control point in said path for accepting said data, said method comprises the steps of:

applying to said communication path a frequency corresponding to a specific DTMF frequency; and band-stop filtering said applied frequency from the reflected transmission from said communication path.

57. The method set forth in claim 56 wherein said applied frequency is the fourth column frequency of the DTMF discrete frequencies.

58. The method set forth in claim 56 further comprising the step of:

applying said frequency only when any frequency within said DTMF bandwidth is present on said communication path.

59. A security system including:

a user source for sending secure and non-secure information;

a control system for accepting, decoding and processing said secure and non-secure information;

a communication path connecting said user and said control system, said control system including:

means for sending over said communication path a plurality of different security control signals, some of said security control signals being in-band with said secure information from said user source and some of said security control signals being a modulated version of any signal on said path; and means concurrently operative with said sending of said security control signals for extracting valid information sent from said user source regardless of said security control signals on said path.

* * * * *

UNITED STATES PATENT AND TRADEMARK OFFICE
CERTIFICATE OF CORRECTION

PATENT NO. : 5,177,785
DATED : January 5, 1993
INVENTOR(S) : Itani et al

It is certified that error appears in the above-indentified patent and that said Letters Patent is hereby corrected as shown below:

On the title page, item [57] in the Abstract, line 13, delete the last word "communication" and insert the correct spelling of the word --communication--.

Col. 14, line 21, delete the word "aperiodicaly" and insert the correct spelling of the word --aperiodically--.

Signed and Sealed this

Eleventh Day of January, 1994

Attest:

BRUCE LEHMAN

Attesting Officer

*Commissioner of Patents and Trademarks*